United States Patent [19]

Beltrano et al.

[11] Patent Number: 5,802,162

[45] Date of Patent: Sep. 1, 1998

[54] METHOD FOR SELECTIVELY CHANGING THE CALL HANDLING CAPACITY OF A TELECOMMUNICATIONS SWITCH

[75] Inventors: Frank Santo Beltrano, Wheaton, Ill.; Kevin John McNeley, Succasunna, N.J.; Roberto Garcia Rizo, Naperville, Ill.; Tushar Ramesh Shah, Lombard, Ill.; Ivy Hui-Fen Ying, Naperville, Ill.

[73] Assignee: Lucent Technologies Inc., Murray Hill, N.J.

[21] Appl. No.: 824,660

[22] Filed: Mar. 24, 1997

Related U.S. Application Data

[63] Continuation of Ser. No. 549,360, Oct. 27, 1995, abandoned.

[51] Int. Cl.$^6$ .................................. H04M 3/00; H04M 5/00
[52] U.S. Cl. .......................... 379/242; 379/196; 370/362
[58] Field of Search ............................. 379/201, 207, 379/242, 243, 196, 197, 198, 211, 221, 230, 8, 1; 370/352, 353, 354, 355, 356, 357, 362

[56] References Cited

U.S. PATENT DOCUMENTS

| 5,109,408 | 4/1992 | Greenspan et al. ................. 379/197 |
|---|---|---|
| 5,426,694 | 6/1995 | Hebert ................................... 379/242 |
| 5,436,957 | 7/1995 | McConnell ......................... 379/197 |
| 5,467,388 | 11/1995 | Redd, Jr. et al. ................... 379/196 |
| 5,546,453 | 8/1996 | Hebert ................................... 379/242 |
| 5,548,640 | 8/1996 | Blondel et al. ..................... 379/242 |

*Primary Examiner*—Krista Zele
*Assistant Examiner*—Scott Wolinsky
*Attorney, Agent, or Firm*—Mony R. Ghose

[57] ABSTRACT

A method for changing the call handling capacity of a telecommunications switch requires authorization from an external source, such as a telecommunications equipment manufacturing company (TEMC). Each switch purchased from the particular switch manufacturer includes a customized upgrade security protocol which limits access to data bus blocks associated with integrated digital carrier units of the switch. To alter the upgrade security program, an authorization code must be retrieved from the TEMC. The authorization code is then entered into the switch, and used to automatically alter the upgrade security protocol so that previously blocked data buses may be activated.

4 Claims, 3 Drawing Sheets

METHOD FOR SELECTIVELY CHANGING THE CALL HANDLING CAPACITY OF A TELECOMMUNICATIONS SWITCH

This is a continuation of application Ser. No. 08/549,360, filed Oct. 27, 1995, now abandoned.

TECHNICAL FIELD

This invention relates to telecommunications networks, and more particularly, to receiving authorization from an external source for increasing the call handling capacity of a switch in such telecommunications networks.

BACKGROUND OF THE INVENTION

The manufacture of switching systems ("switches") for use in telecommunications involves complex processes, and a significant capital investment. A state-of-the-art digital switch, such as the 5ESS® switch manufactured and sold by Lucent Technologies comprises many complicated components that must conform to high performance standards, and experience minimal "downtime". To reduce per unit production cost, many telecommunications equipment manufacturers generate "generic" or "standard" switches which can be customized to meet the needs of a specific application.

A typical standard switch includes: a central processing unit to administer global control functions; a communications component to relay messages among various switch components; and multiple switch modules to establish call connections. Each switch module contains a plurality of line units which act as an interface between a telephone customer and the switch. An integrated digital carrier unit (IDCU) is one type of line unit. The line units are comprised of a plurality of data buses. Each data bus in a line unit is referred to as a peripheral interface data bus (PIDB). Each data bus includes a fixed number of time slots, each time slot being conventionally used as the designated carrier of a single voice call. Accordingly, an increase in the number of time slots per line unit results in a corresponding increase in the ability of the line unit to handle calls.

A standard switch purchased from an equipment manufacturer is equipped with a pre-defined number of data buses per line unit. One way for a switch customer to supplement switch call handling capacity is install more data buses (or time slots) per line unit. Installing hardware in an operational switch requires deactivating switch service, and is time consuming. To avoid inconveniences associated with costly hardware upgrades, equipment manufacturers now produce standard switches with extended IDCUs. Extended IDCUs have a maximum number of data buses that a particular equipment manufacturer can install in a switch even though most switch customers do not need the full capability of the extended IDCU when a switch is initially purchased and installed. However, such switch customers are typically not willing to purchase a standard switch which includes of the cost the extended IDCU which they are not using.

Therefore, there is a need in the art for enabling a switch manufacturer to satisfy the customer's need for increasing call handling capacity without requiring physical hardware changes, and without exacting unacceptable initial costs from the customer.

SUMMARY OF INVENTION

This need is addressed and a technological advance is achieved in the art by the method and system of the present invention which enables an equipment manufacturer to selectively authorize access to data buses which are included in a standard switch when initially produced.

In the preferred embodiment of the method and system of the present invention each switch includes a customized upgrade security protocol which blocks access to specified data bus blocks in a switch line unit. In accordance with the preferred embodiment of the method of the present invention, a request for increase in call handling capacity of an existing switch received by an equipment manufacturer from the customer. The switch customer is queried so that switch-related data may be retrieved, and used to access a database that includes authorization codes specific to the switch customer's equipment. Use of the authorization code enables the switch to automatically alter the upgrade security protocol to allow access to data buses which could not be previously accessed by the switch customer.

DETAILED DESCRIPTION

For purposes of example, assume that a switch customer (SC) of a telecommunications equipment manufacturing company (TEMC) is a local exchange carrier which maintains a plurality of switches to provide telephone service to its customers. Also assume that the TEMC offers four distinct line unit call handling capacity options which may be purchased by a SC. Although each standard TEMC switch includes IDCUs which have the ability to provide maximum call handling capacity, each switch is also equipped with an upgrade security protocol (USP). The USP ensures that the data bus blocks associated with the standard option are the only data buses which may be accessed by the SC without receiving an authorization code from the TEMC. Each switch module is initialized with a custom USP which is embedded with the capability to recognize a unique authorization code (based on switch identification, switch module identification, and IDCU identification) associated with various call handling capacity options. The authorization code is used by the switch to alter the USP so that previously inaccessible data buses may be activated, as described below. All TEMC standard issue switches include the "basic" (B) call handling capacity option. The "basic" option implies that all IDCUs contains a minimal number of operational data buses. The "Tier 1" (T1) option includes an larger number of operational data buses per IDCU, and the "Tier 2" (T2) option offers even more operational data buses per IDCU than the "Tier 1" option. The "Deluxe" (D) option utilizes the full data bus operational capacity of the IDCU. Assume that all of above-mentioned SC's switches are standard issue switches purchased from the TEMC.

Figure 1A:
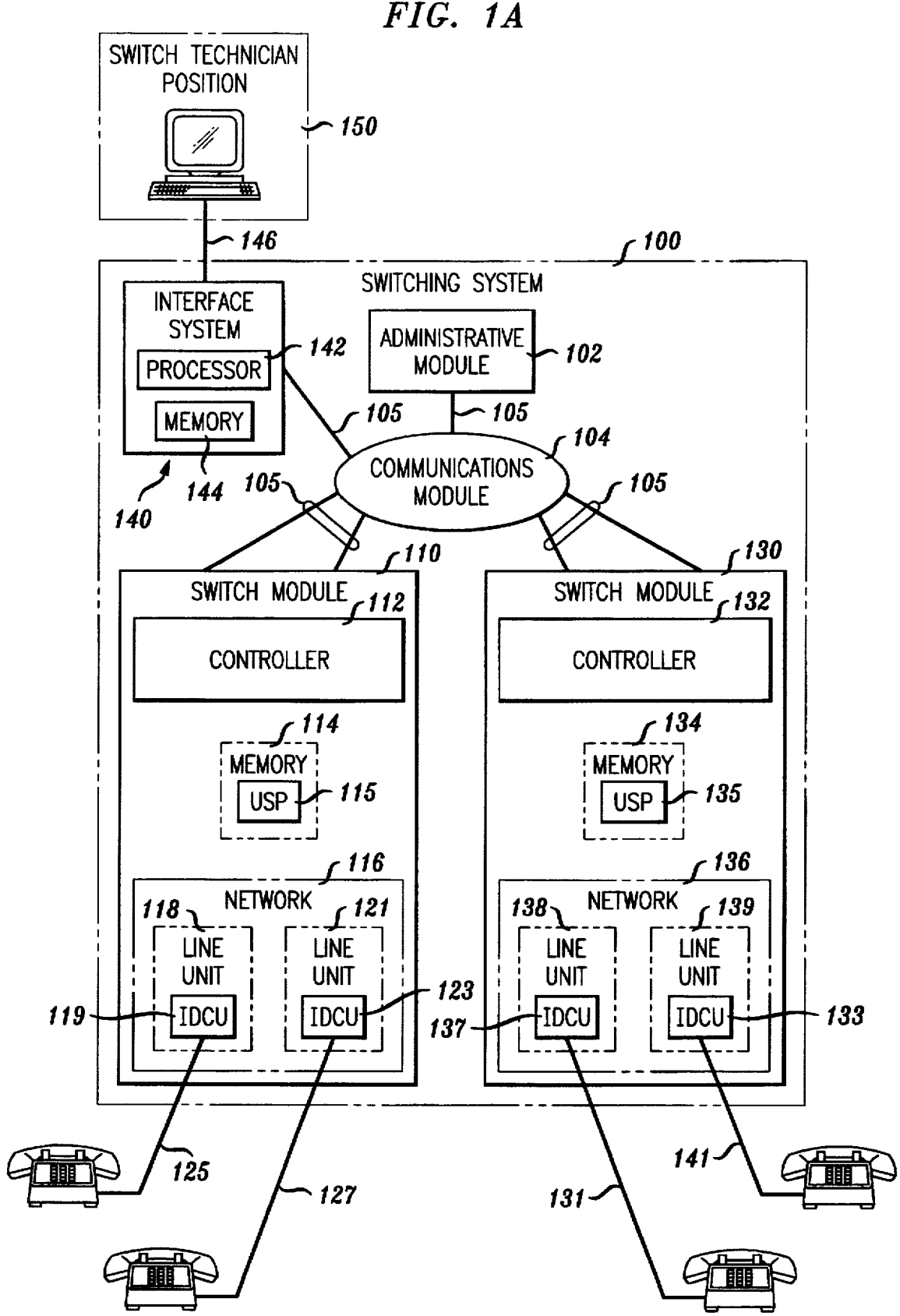
FIG. 1A is a simplified block diagram of a switch in which the present invention may be practiced.

FIG. 1 shows a simplified block diagram of one of the switches purchased by the SC from the TEMC. Particularly, switch 100 includes: administrative module (AM) 102 for administering system-wide control functions; communications module (CM) 104 for relaying messages among switch components; and two switching modules (SMs) 110, and 130 for establishing call connections. The various components of switch 100 are interconnected via network control and timing (NCT) links 105. As convention dictates, dual NCT links are shown between CM 104 and SM 110 and SM 130, respectively. Also shown is interface system (IS) 140 including processor 142 and data memory 144. IS 140 is interconnected to switch technician position 150 via data link 146.

SM 110 comprises controller 112, memory 114, and network element 116. Memory 114 includes upgrade security program (USP) 115 which is installed in each switch manufactured by the TEMC. In this embodiment, USP 115 is a security program which blocks access to all data buses except those associated with the "Basic" call handling capacity option. In other words USP 115 blocks access to particular data bus blocks, as described in detail below. Network element 116 includes line units 118, and 121 which act as interfaces between a customer line and switch 100. In this embodiment, line unit 118 serves customer line 125 via IDCU 119, and line unit 121 serves customer line 127 via IDCU 123. Since SM 130 is similar to SM 110, it is not described in detail. SM 130 comprises: controller 132; memory 134; and network element 136. Memory 134 includes upgrade security program (USP) 135. Network element 136 comprises line unit 138 including IDCU 137 and line unit 139 including IDCU 133. Line units 138 and 139 serve customer lines 131 and 141, respectively.

Figure 1B:
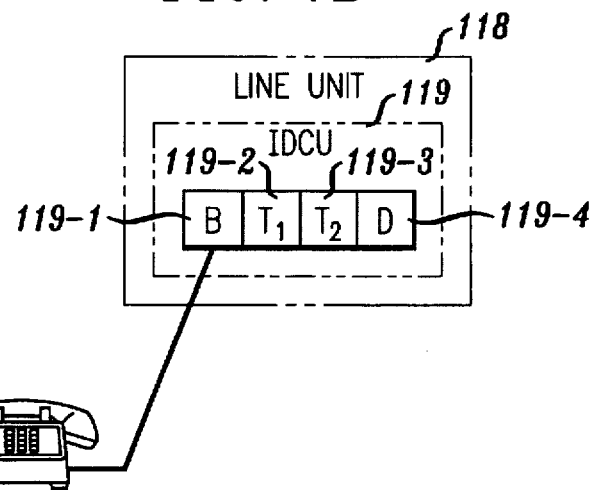
FIG. 1B is a detailed view of a line unit.

FIG. 1B shows a detailed view of line unit 118 in switch 100. Although only line unit 118 is shown, it is representative of all line units in the switch. Line unit 118 includes IDCU 119 which is divided into four distinct data bus "blocks" which correspond to the four call handling capacity options offered by the TEMC. Data bus block 119-1 represents the number data buses a SC receives when a standard switch is purchased without optional upgrades (that is, it is the number of data buses associated with the "Basic" option). Data bus block 119-2 is associated with the "Tier 1" option. In other words, if a SC purchases a T1 upgrade, the data buses in both blocks 119-1 and 119-2 can be accessed by the switch customer. Data bus block 119-3 is associated with the "Tier 2" call handling capacity option, and data bus block 119-4 is included in the "Deluxe" option. If a SC desires the maximum call handling capacity associated with switch 100, the "Deluxe" option upgrade should be purchased because it allows access to all data buses contained in blocks 119-1 through 119-4. After a switch has been purchased by a SC, each succeeding data bus block after block 119-1 is operational only when a unique authorization code is entered into the switch to alter the USP stored in memory. The authorization code is obtained by the SC from the TEMC in a process described in detail below. Upon receipt of the authorization code, a SC technician enters the code into the switch via an interface system, such as IS 140. The authorization code is used by the switch to automatically alter the upgrade security protocol so that previously blocked data buses can be activated. In other words, if a SC elects to upgrade from a "Basic" option to a "Tier 2" option, entry of an authorization code alters the USP so that data bus blocks associated with the "Tier 1" and "Tier 2" options (e.g. blocks 119-2 and 119-3) may be accessed. Memory recovery techniques known in the art can be used to restore the latest version of the USP if the switch needs to be re-initialized for any reason.

Figure 2:
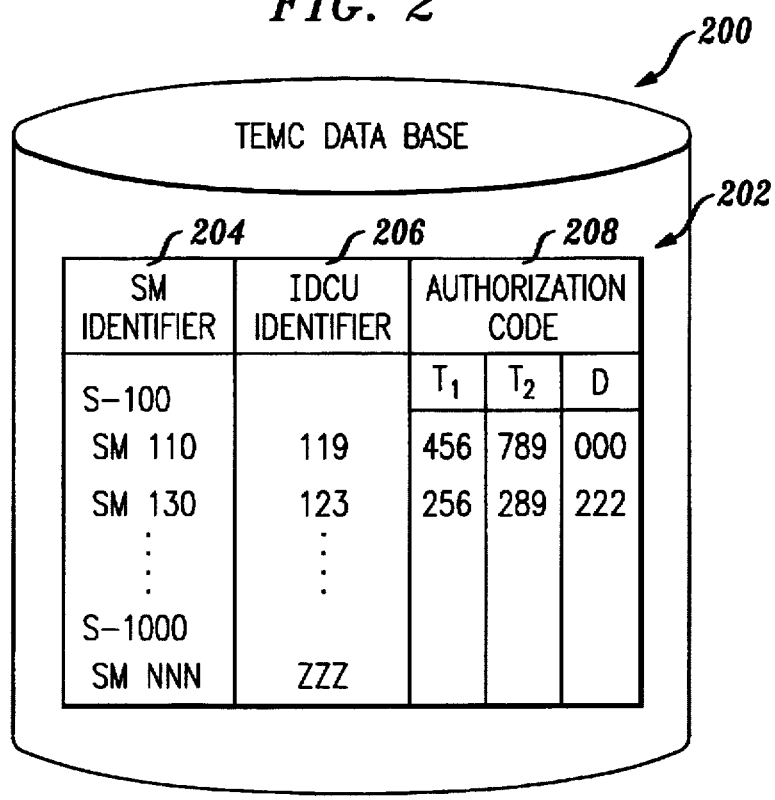
FIG. 2 is a representation of a database including authorization codes in accordance with the preferred embodiment of the method of the present invention.

FIG. 2 is an exemplary representation of a TEMC's data base 200 which is used to store authorization codes for selectively controlling access to data bus blocks in each IDCU of each switch sold by the TEMC. Table 202 is a representation of the type of data stored in database 200. Table 202 includes: SM identifier column 204; IDCU identifier column 206; and authorization code column 208. SM identifier column 204 comprises a list of all switch modules contained in all switches sold by the TEMC. In this example, column 204 is populated with switch modules identified as S-100 SM 110, SM 130 through S-1000 SM "NNN" representing switch modules 118 through 130 of switch 100 and switch modules in other switches through switch 1000 switch module "NNN". Column 206 comprises a list of all IDCUs contained in all switches sold by the TEMC. In this example, column 206 is populated with IDCUs identified as IDCU 119, IDCU 123 through IDCU "ZZZ". Authorization code column 208 is divided into three sections corresponding to the unique authorization codes required for the various call handling capacity upgrade options. In this embodiment, column 208 is populated with authorization codes for the T1, T2 and D options for each IDCU of each switch sold by the TEMC. For example, an upgrade of IDCU 119 so that it has maximum data bus capacity (i.e. the "Deluxe" option) requires entry of the authorization code "000" into switch 100. While a simple three digit authorization code is shown for clarity, operational embodiments may utilize complex codes or encryption techniques to prevent fraudulent call handling capacity upgrades.

Figure 3:
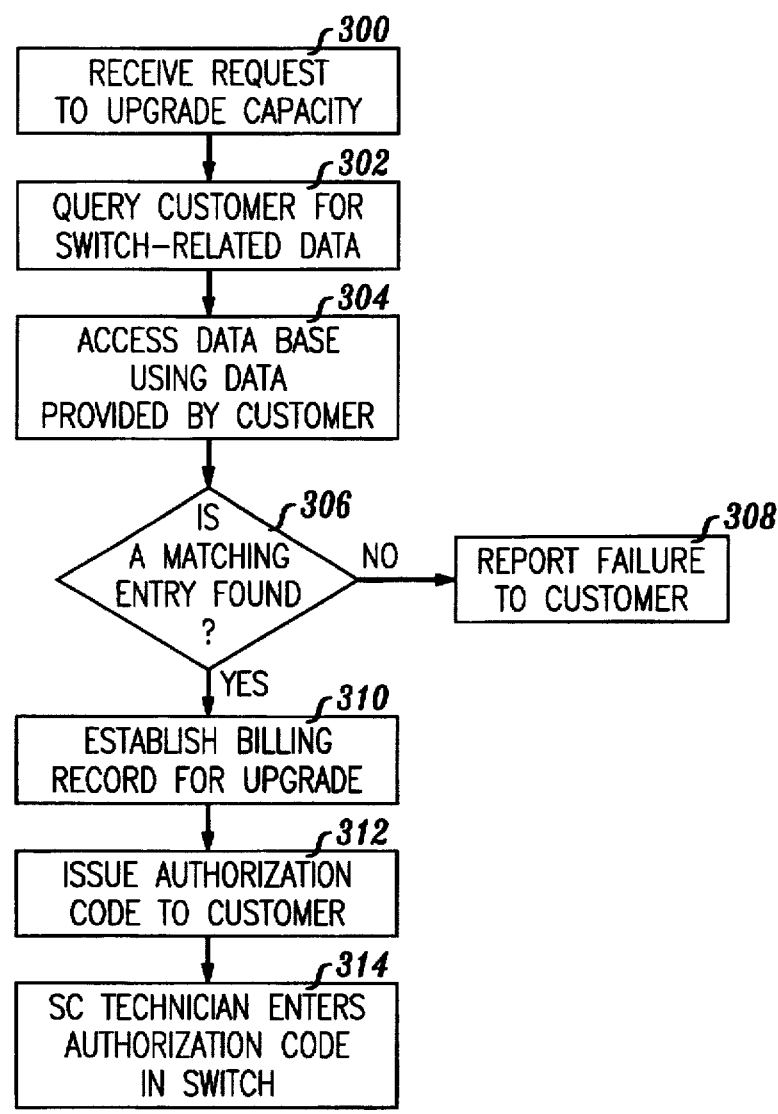
FIG. 3 is a flow diagram of the steps required for increasing the call handling capacity of a standard switch in accordance with the preferred embodiment of the method of the present invention.

FIG. 3 is a flow diagram of the steps required to selectively authorize upgrades to call handling capacity options of a TEMC switch, such as switch 100. Assume that the SC who owns switch 100 wants to increase the switch call handling capacity of IDCU 119 from the "Basic" data bus access option to the "Tier 1" data bus access option. Accordingly, an SC representative contacts a TEMC representative to arrange the upgrade. The process begins in step 300 when the TEMC representative receives a request from the SC representative to upgrade the call handling capacity of IDCU 119.

The process continues to step 302 in which the TEMC representative queries the SC representative for switch-related data. In the preferred embodiment, switch-related data comprises identifiers of the switch module(s) and IDCU(s) for which an upgrade is desired. The SC representative must also identify the requested option (e.g. T1, T2 or D). In step 304, the TEMC representative accesses a database by using the switch-related data provided by the SC representative. In this example, the TEMC representative accesses database 200 using SM identifier 110 and IDCU identifier 119 provided by the SC representative so that the data bus access option may be upgraded from "Basic" to "T1".

In decision step 306, the TEMC representative determines whether SM and IDCU identifiers provided by the SC representative match data contained in the TEMC database. If the outcome of decision 306 is a "NO" determination, the process continues to step 308 in which the TEMC representative reports a failure to the SC representative, and indicates that the call handling capacity upgrade cannot be accomplished with the information provided. If the outcome of decision step 306 is a "YES" determination, however, the process continues to step 310 in which the TEMC representative establishes a billing record for the requested upgrade option. In this example, the TEMC representative establishes a record so that the SC can be billed for an upgrade from the "Basic" call handling capacity option to the "Tier 1" call handling capacity option for IDCU 119. In step 312, the TEMC representative issues an authorization code retrieved from the TEMC database to the SC representative. The process continues to step 314 in which the SC representative enters the authorization code retrieved from the TEMC into the switch. Once the authorization code is entered, the USP is automatically converted to allow access to data bus block 119-2 (i.e. data bus block associated with the T1 option) as well as data bus block 119-1. In alternative embodiments, the authorization code may be provided by external sources other than the TEMC.

While the invention has been described in accordance to the preferred embodiment, other variations or modifications may be devised by those skilled in the art without departing from the scope of the invention.

What is claimed is:

1. In a telecommunications switch comprising a central processing unit, a communications module, an interface system and at least one switch module which serves a customer line, a method comprising the steps of:

accessing a database maintained by an external source to obtain an upgrade authorization code for changing the call handling capacity of the telecommunications switch; and entering the upgrade authorization code obtained from the database via the interface system, the interface system identifying from the authorization code selected portions of hardware within the switch module, and causing said selected portions of hardware to be activated.

2. The method of claim 1 and further comprising the step of:

using switch-related data to access the database.

3. A telecommunications switch comprising:

a central processing unit for administering global control functions interconnected to a communications module;

at least one switch module interconnected to the communications module, wherein the switch module includes at least one integrated digital carrier unit, and a switch module memory; and an upgrade security protocol stored in the switch module memory for blocking access to pre-specified portions of the integrated digital carrier unit.

4. the telecommunications switch of claim 3 wherein the upgrade security protocol may be altered by entering an authorization code into the telecommunications switch via an interface system.

* * * * *